United States Patent
Knoblauch

(10) Patent No.: US 8,521,669 B2
(45) Date of Patent: Aug. 27, 2013

(54) NEURAL ASSOCIATIVE MEMORIES BASED ON OPTIMAL BAYESIAN LEARNING

(75) Inventor: Andreas Knoblauch, Seligenstadt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 593 days.

(21) Appl. No.: 12/789,502

(22) Filed: May 28, 2010

(65) Prior Publication Data
US 2010/0312731 A1    Dec. 9, 2010

(30) Foreign Application Priority Data

Jun. 4, 2009   (EP) .................................. 09 161 922
Nov. 9, 2009   (EP) .................................. 09 175 410

(51) Int. Cl.
G06E 1/00   (2006.01)
G06E 3/00   (2006.01)
G06F 15/18  (2006.01)

(52) U.S. Cl.
USPC ......................................................... 706/16

(58) Field of Classification Search
USPC ......................................................... 706/16
See application file for complete search history.

(56) References Cited

U.S. PATENT DOCUMENTS
2004/0139040 A1*   7/2004   Nervegna et al. ............... 706/15

FOREIGN PATENT DOCUMENTS
EP   2 012 260 A1   1/2009
EP   2012260   7/2009

OTHER PUBLICATIONS

Burks, Arthur W. et al., "Preliminary Discussion of the Logical Design of an Electronic Computing Instrument", U.S. Army Ordnance Department, 1946, pp. 1-35.
Dayas, P. et al., "Optimising Synaptic Learning Rules in Linear Associative Memories", Biological Cybernetics, 1991, pp. 253-265.
Hasler, Stephan et al., "A comparison of Features in Parts-Based Object Recognition Hierarchies", Honda Research Institute Europe GmbH, 2007, pp. 210-219.
Hopfield, J.J., "Neural Networks and Physical Systems with Emergent Collective Collective Computational Abilities", Proceedings of the National Academy of Science, USA, 1982, pp. 2554-2558.
Kanerva, Pentti, "Sparse Distributed Memory and Related Models", 1993, pp. 1-41.
Kirstein, Stephan et al., "A Biologically Motivated Visual Memory Architecture for Online Learning of Objects", neural Networks 2008, pp. 65-77.
Knoblauch, Andreas, "Synchronization and Pattern Separation in Spiking Associative Memories and Visual Cortical Areas", 2003, pp. 1-189.
Knoblauch, Andreas et al., "Memory Capacities for Synaptic and Structural Plasticity", Neural Computation, 2009, pp. 289-341.
Palm, Gunther et al., "Associative Data Storage and Retrieval in Neural Networks", Models of Neural Networks III, 1996, pp. 79-118.
Steinbuch, Von K., "Die Lernmatrix", Kybernetik, 1961, pp. 36-45.

(Continued)

*Primary Examiner* — Kakali Chaki
*Assistant Examiner* — Vincent Gonzales
(74) *Attorney, Agent, or Firm* — Squire Sanders (US) LLP

(57) ABSTRACT

This invention is in the field of machine learning and neural associative memory. In particular the invention discloses a neural associative memory structure for storing and maintaining associations between memory address patterns and memory content patterns using a neural network, as well as methods for storing and retrieving such associations. Bayesian learning is applied to achieve non-linear learning.

16 Claims, 4 Drawing Sheets

(56) References Cited

OTHER PUBLICATIONS

Wersing, Heiko et al., "Learning Optimized Features for Hierarchical Models of Invariant Object Recognition", Neural Computation 2003, pp. 1-27.
Willshaw, D.J. et al., "Non-Holographic Associative Memory", Nature vol. 222, Jun. 7, 1969, pp. 960-962.
Sommer, Friedrich et al., "Bayesian Retrieval in Associative Memories with Storage Errors" IEEE Trans Neural Networks, vol. 9, No. 4, Jul. 4, 1998, pp. 705- 713.
Buckingham, Jay et al., "On Setting Unit Thresholds in an Incompletely Connected Associative Net", Network: Computation in Neural Systems, vol. 4, Issue 4, Nov. 1993, pp. 441-459.
Knoblauch, Andreas, "Neural Associative Memory for Brain Modeling and Information Retrieval", Information Processing Letters, vol. 95, Issue 6, Sep. 2005, pp. 537-544.
EP Communication, European Search Report, EP 09 17 5410, Feb. 19, 2010, a total of 9 pages.
Friedrich T. Sommer et al., Bayesian Retrieval in Associative Memories with Storage Errors, IEEE Transactions on Neural Networks, vol. 9, No. 4, Jul. 1998, pp. 705-713.
Jay Buckingham et al., On setting unit thresholds in an incompletely connected associative net, Network 4, 1993, pp. 441-459.
Andreas Knoblauch, Neural associative memory for brain modeling and information retrieval, Information Processing Letters, www.elsevier.com, 2005, pp. 537-544.
Andreas Knoblauch, Synchronization and pattern separation in spiking associative memories and visual cortical areas, University Ulm, Oct. 1, 2003, a total of 190 pages.
Richard Palmer et al., Introduction to the theory of neural computation, Durham and Copenhagen, Aug. 1990, a total of 10 sheets.
G. Palm, Cell Assemblies as a Guideline for Brain Research, Concepts in Neuroscience, vol. 1, No. 1 , 1990, pp. 133-147.
T. Kohonen et al., Fast Adaptive Formation of Orthogonalizing Filters and Associative Memory in Recurrent Networks of Neuron-Like Elements, Biol. cybernetics 21, 1976, a total of 13 pages.
Pentti Kanerva, Sparse Distributed Memory and Related Models, SDM and Related Models, in M. H. Hassoun, ed., Associative Neural Memories: Theory and Implementation, 1993, a total of 41 pages.

\* cited by examiner

| AM model | M [# memories] | C [bits/synapse] | $C^I$ [bits/computer bit] | $C^S$ [bits/relevant synapse] |
|---|---|---|---|---|
| Linear AM [2, 19] | asym. max. | asym. max. | near zero | low |
| Willshaw AM [20, 22] | low | low | low | low |
| Iinhibitory WAM [11] | low | low | maximal | maximal |
| Bayes AM [14] | maximal | maximal | near zero | low |
| Zip AM [13] | near max | near max | maximal | maximal |

Fig. 2

NEURAL ASSOCIATIVE MEMORIES BASED ON OPTIMAL BAYESIAN LEARNING

This invention relates to the field of machine learning and neural associative memory. In particular the invention discloses a neural associative memory for storing and maintaining associations between memory address patterns and memory content patterns using a neural network, as well as methods for storing and retrieving such associations. Bayesian learning is applied to achieve non-linear learning.

The inventive neural associative memory is designed to store associations between memory address patterns and memory content patterns in the neural network, i.e. in a network of neurons and synaptic connections, for example in a set of synaptic weights between the neurons and also other properties and values of the neural network. Neural networks are applicable in all areas where pattern (and/or sequence) recognition is needed to identify a specific patterns, situations or to process information derived from observations made by machinery such as robots, autonomous vehicles or systems designed to assist a human operators—especially where the complexity of the data or a task renders an implementation of functions by hand impractical.

A neural network can generally be used to infer functions from observations as neural networks allow to work with no or only little a priori knowledge on the problem to be solved and also allows to provide for a failure tolerant behavior. Problems that may be addressed, may relate to system identification and control (vehicle control, process control), game-playing and decision making, machine vision and pattern recognition (facial recognition, object recognition, gesture recognition, speech recognition, (handwritten) character and text recognition), medical diagnosis, financial applications (automated trading systems), data mining (or knowledge discovery) and visualization.

Using the advantages of neural networks the neural associative memory structure accepts an input signal or input query pattern as a memory address pattern, which may be tainted with noise, and derives an output signal or output pattern that is identical or similar to the memory content pattern associated with the memory address pattern obtained from the input signal or input query pattern. The input signal or input query pattern may be accepted by one or more sensors, e.g. for visual or acoustic input. In the following, only the terms input query pattern and output pattern are used. The output pattern may be output through an software or hardware interface or may be transferred to another processing unit.

In addition, the invention combines the advantages of neural networks with Bayesian learning principles including estimates of query component error probabilities applied to provide a non-linear learning method. Computations and transformations required by this application as well those necessary for maintaining, adjusting and training the neural network may be performed by a processing means such as one or more processors (CPUs), signal processing units or other calculation, processing or computational hardware and software, which might also be adopted for parallel processing. All the processing and computations may be performed on standard of the shelf hardware or specially designed hardware components or specific hardware which may be adapted for parallel processing.

Some portions of the detailed description that follows are presented in terms of algorithms and symbolic representations of operations on data bits within a computer. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

In order to process obtained information, the invention applies neural networks, which can generally be used to infer functions from observations. Neural networks allow working with none or only little a priori knowledge on a problem to be solved and also show a failure tolerant behavior. Problems that may be addressed relate, e.g., to feature identification, control (vehicle control, process control), game-playing and/or decision making, machine vision and/or pattern recognition (facial recognition, object recognition, gesture recognition, speech recognition, (handwritten) character and text recognition), medical diagnosis, financial applications (automated trading systems), data mining (or knowledge discovery) and/or visualization, etc.

A neural network thereby consists of a set of neurons and a set of synapses. The synapses connect neurons and store information in parameters called weights, which are used in transformations performed by the neural network and learning processes.

Typically, an input signal or input pattern is accepted from a sensor, which is processed using the neural networks implemented by hardware units and software components. An output signal or output pattern is obtained, which may serve as input to other systems for further processing, e.g. for visualization purposes. The input signal may be supplied by one or more sensors, e.g. for visual or acoustic sensing, but also by a software or hardware interface. The output pattern may as well be output through a software and/or hardware interface or may be transferred to another processing unit or actor, which may be used to influence the actions or behavior of a robot or vehicle.

Computations and transformations required by the invention and the application of neural networks as well as those necessary for maintaining, adjusting and training the neural network, may be performed by a processing means such as one or more processors (CPUs), signal processing units or other calculation, processing or computational hardware and/or software, which might also be adapted for parallel processing. Processing and computations may be performed on standard off the shelf (OTS) hardware or specially designed hardware components. A CPU of a processor may perform the calculations and may include a main memory (RAM, ROM), a control unit, and an arithmetic logic unit (ALU). It may also address a specialized graphic processor, which may provide dedicated memory and processing capabilities for handling the computations needed.

A neural network is configured such that the application of an input pattern or a set of input patterns produces (either 'direct' or via a relaxation process) a set of (desired) output patterns. Various methods to set strengths/weights of synaptic connections between neurons of the neural network exist. One way, which is not an object of the invention, is to set the weights explicitly, using a priori knowledge. Another way is to 'train' the neural network by feeding it teaching patterns and letting it change its weights (learning) according to some learning rule/algorithm.

In particular, the method described by the invention may be provided as a software program product on a (e.g., portable) physical storage medium which may be used to transfer the program product to a processing system or a computing device in order to instruct the system or device to perform a method according to this invention. Furthermore, the method may be directly implemented on a computing device or may be provided in combination with the computing device.

Further, the invention can also be applied in various domains, one of them being robotics but as well applied in systems for ground, water and/or air bound vehicles, including systems designed to assist a human operator. The method and/or system disclosed herein in general may be used whenever a technical (e.g., an electronic) system is required to autonomously learn characteristics and/or properties of objects (e.g., size, distance, relative/absolute position also to other objects, spatial alignment, relative movement, speed and/or direction and other related object features or feature patterns) which are presented to the system.

BACKGROUND OF THE INVENTION

In the classical von Neumann computing architecture, computation and data storage is performed by separate modules, the central processing unit and the random access memory, respectively (cf., e.g., A. W. Burks, H. H. Goldstine, and J. von Neumann. Preliminary discussion of the logical design of an electronic computing instrument. Report 1946, U.S. Army Ordonance Department, 1946). A memory address sent to the random access memory gives access to the data content of one particular storage location. Associative memory structures are computing architectures in which computation and data storage is not separated (cf. T. Kohonen. Associative memory: a system theoretic approach. Springer, Berlin, 1977). For example, an associative memory can store a set of associations between pairs of (binary) patterns $\{(u^\mu \rightarrow v^\mu): \mu=1, \ldots, M\}$ (see FIGS. 1a and 1b).

FIG. 1a illustrates the memory tasks. In the storage phase, M associations of memory address patterns $u^\mu$ and content patterns $v^\mu$ are stored in the associative memory device (AM) as shown exemplarily in FIG. 1a (learning of associations between M pattern pairs, $u^\mu \rightarrow v^\mu$). In the retrieval phase, the AM is addressed with an input query pattern $\tilde{u}$ typically resembling one of the previously stored memory address patterns $u^\mu$. The AM returns the retrieval result $\hat{v}$ that should be similar to the associated memory content pattern $v^\mu$, as shown exemplarily in FIG. 1b (retrieving phase).

Similar as in random access memory, a query pattern $u^\mu$ entered in the associative memory can serve as address for accessing the associated pattern $v^\mu$. However, the tasks performed by the two types of memory differ fundamentally. Random access is only defined for query patterns that are valid addresses, that is, for the set of u patterns used during storage. The random access task consists of returning the data record at the addressed location (look-up).

In contrast, associative memory structures accept arbitrary input query patterns $\tilde{u}$ and the computation of any particular output involves all stored data records rather than a single one. Specifically, the associative memory task consists of comparing an input query pattern $\tilde{u}$ with all stored addresses and returning an output pattern equal (or similar) to the pattern $v^\mu$ associated with the memory address pattern $u^\mu$ most similar to the input query pattern. Thus, the associative memory task includes the random access task but is not restricted to it. It also includes computations such as pattern completion, denoising or data retrieval using incomplete cues.

Neural associative memory structures are parallel implementations of associative memory in a network of neurons in which associations are stored in a set of synaptic weights W between neurons typically employing fast Hebbian-type learning methods (cf., e.g., J. Hertz, A. Krogh, and R. G. Palmer. Introduction to the theory of neural computation. Addison-Wesley, Redwood City, 1991). Associative networks are closely related to Hebbian cell assemblies (cf., e.g., G. Palm. Neural Assemblies. An Alternative Approach to Artificial Intelligence. Springer, Berlin, 1982) and play an important role in neuroscience as models of neural computation for various brain structures, in particular neocortex, hippocampus, and cerebellum.

STATE OF THE ART

Most two-layer neural associative memory models can be assigned to one of the following two classes. The simplest model of neural associative memory is the so-called Steinbuch or Willshaw model with binary synapses and clipped Hebbian learning (cf., e.g., A. Knoblauch, G. Palm, and F. T. Sommer. Memory capacities for synaptic and structural plasticity. Neural Computation, 2009; K. Steinbuch. Die Lernmatrix. Kybernetik, 1:36-45, 1961; D. J. Willshaw, O. P. Buneman, and H. C. Longuet-Higgins. Non-holographic associative memory. Nature, 222:960-962, 1969). Here a single coincidence of presynaptic and postsynaptic activity is sufficient to increase the synaptic weight from 0 to 1, while further coincidences do not cause further changes.

In contrast, for linear learning models as previously investigated (cf., e.g., P. Dayan and D. J. Wilishaw. Optimising synaptic learning rules in linear associative memory. Biological Cybernetics, 65:253-265, 1991; J. J. Hopfield. Neural networks and physical systems with emergent collective computational abilities. Proceedings of the National Academy of Science, USA, 79:2554-2558, 1982; G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996) the contributions of each pattern pair add linearly. For binary patterns the general learning rule can be described by four values $\alpha$, $\beta$, $\gamma$, and $\delta$, specifying the weight increments for the pre-/postsynaptic activations 0/0, 0/1, 1/0, and 1/1.

The maximal storage capacity C is almost identical for the two models: The Willshaw model can achieve up to 0.69 bits per synapse, while the linear learning model can achieve a slightly higher capacity of 0.72 bits per synapse (bps) (although the synapses may have gradual weights and thus need much more physical memory to be represented). Closer investigations reveal that the Willshaw model can achieve non-zero capacity only for very sparse patterns where the number of active units per pattern vector scales logarithmic with the vector size. In contrast, the linear model is believed to achieve the maximum C=0.72 bps for almost arbitrary sparseness. Only for linearly or non-sparse patterns performance drops to the capacity of the Hopfield model (C=0.14 bps, cf., e.g., J. J. Hopfield. Neural networks and physical systems with emergent collective computational abilities. Proceedings of the National Academy of Science, USA, 79:2554-2558, 1982). In any case, the linear learning model achieves maximal storage capacity only for the optimal covariance learning rule (e.g., see, e.g., G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996) which becomes equal to the Hebb rule for very sparse patterns, and equal to the Hopfield rule for non-sparse patterns. Moreover, the capacity that can actually be achieved in finite networks is well below that of the Willshaw model (e.g., C=0.2 bps vs. C=0.5 bps for n=$10^5$ neurons; see, e.g. A. Knoblauch. Neural associative networks with incremental learning rules. HRI-ED Report 08-03, Honda Research Institute Europe GmbH, D-63073 Offenbach/Main, Germany, May 2008). The performances of different models of neural associative memory are summarized by the Table shown in FIG. 2.

The table pictured in FIG. 2 shows a comparison of different associative memory (AM) models with respect to the following performance measures. The pattern capacity M measures the maximal number of stored memories. The network capacity C measures the maximal information a synapse can store in a structurally static network. The information capacity $C^I$ measures the maximally stored information per computer bit in a digitally compressed representation. Finally, the synaptic capacity $C^S$ measures the maximal information a synapse can store in a structurally plastic network assuming that irrelevant synapses can be pruned. The Linear AM achieves maximal M and C in the asymptotic limit of very large networks but only low $C^I$ and $C^S$. The (excitatory) Willshaw AM has always low performance unless the memories are extremely sparse. The Inhibitory WAM has low M and C but achieves maximal $C^I$ and $C^S$ even for moderate sparseness. The novel Bayes AM achieves maximal M and C even for finite networks but only low $C^I$ and $C^S$. The novel Zip AM achieves maximal or near maximal performance for all measures.

A well known problem of these two-layer approaches is that the high theoretical capacities can be reached only under some artificial assumptions. For example, most theories assume randomly generated memory patterns, where each pattern component, e.g., $u_i^\mu$, is generated independently of other components. In such a setting the memory address patterns are uniformly distributed in the pattern space. Another assumption often employed by these models is that the pattern activities $k^\mu$ and $l^\mu$ have a low variance, for example constant $k^\mu$=k and $l^\mu$=l. However, for real-world technical applications (and very likely also for the brain), these assumptions are invalid: Memories commonly cluster in a complex way in the memory space, and pattern activities are often broadly distributed. Such realistic conditions can strongly decrease storage capacity C and increase output noise $\epsilon$ in these previous memory systems. Although, due to its two-layer structure, also the current invention cannot solve these problems in principle way, numerical experiments have revealed that the current invention is much more robust against "correlated" patterns and broadly distributed pattern activities.

Actually, the two-layer memory models can be used as building blocks to implement larger systems with a more complex hierarchical structure. For example, some brain theories consider the brain as a complex network of interconnected associative memories (cf., e.g., G. Palm. Neural Assemblies. An Alternative Approach to Artificial Intelligence. Springer, Berlin, 1982). For technical applications at least three layer networks are of interest because of well known limitations of two-layer networks (which cannot compute XOR functions, for example). One possible strategy is to map each memory address patterns $u^\mu$ into a high-dimensional space w and then associate the corresponding patterns $w^\mu$ with the memory content patterns vu. By this procedure different memory content patterns $v^{\mu_1}$ and $v^{\mu_2}$ can be associated with similar memory address patterns $u^{\mu_1} \approx u^{\mu_2}$ and, thus, the problems of storing "correlated" memories and storing memories with broadly distributed pattern activities (as described above) become tractable. For example, previously a three layer system has been described (cf., e.g., P. Kanerva. Sparse Distributed Memory. MIT Press, Cambridge, Mass., 1988) where, in the first stage, the address memories are de-correlated by a random projection.

Similarly, in EP 07 110 870, a four-layer memory system is described, where the intermediary patterns $w^\mu$ are systematically chosen in order to minimize output noise. The current invention could be used, for example, in such multi-layer systems as building blocks, improving memory performance by replacing the previously employed Willshaw, Hopfield, or random networks.

The document "Bayesian Retrieval in Associative Memories with Storage Errors" by F. T. Sommer and P. Dayan (IEEE Transactions On Neural Networks, Vol. 9, No. 4, July 1998) describes how iterative retrieval strategies emerge naturally from considerations of probabilistic inference under conditions of noisy and partial input and a corrupted weight matrix. Start from a conditional probability distribution over possible patterns for retrieval the described method contains information available to an observer of a network. Since the distribution is over exponentially many patterns, it is used to develop approximate, but tractable, iterative retrieval methods. One performs maximum likelihood inference to find the single most likely pattern, using the (negative log of the) conditional probability as a Lyapunov function for retrieval. The second method makes a mean field assumption to optimize a tractable estimate of the full conditional probability distribution. In the absence of storage errors, both models are very similar to the Willshaw model, where standard retrieval is iterated using a particular form of linear threshold strategy.

However, Sommer and Dayan only optimize retrieval by Bayesian methods, but not learning. In fact, as can be seen from eq. 1 of the document by Sommer and Dayan, the matrix of synaptic weights is binary and learning is identical to the well-known Willshaw model (Willshaw et al., 1969). Thus, they implement (or rather approximate) optimal Bayesian retrieval given the binary weight matrix of the Willshaw model.

In contrast, the inventive network implements optimal Bayesian learning and retrieval given the counter variables (M1, M1', M11) defined below. In particular, the resulting synaptic weights of our network are real-valued and differ from the binary weights computed by the model of Sommer and Dayan. Therefore, the network presented herein will achieve a much higher performance (i.e., lower output noise, higher capacity).

Second, Sommer and Dayan employ iterated retrieval in a recurrent (auto-associative) network according to equations 2, 23, and 34 of the document in order to approximate optimal Bayesian retrieval. In contrast, the network presented herein implements optimal Bayesian retrieval in a single read-out step focusing on a feed-forward (hetero-associative) scenario, although it can be applied also to auto-association.

The target of the invention is to provide efficient implementations of neural associative memory employing optimal non-linear learning methods and optimal threshold strategies.

SUMMARY OF THE INVENTION

This object is achieved by means of the features of the independent claims. The dependent claims develop further the central idea of the invention.

The invention therefore provides neural associative memory structure for maintaining associations between memory address patterns and memory content patterns, the memory structure comprising a Bayesian probability framework, a neural network consisting of a set of synapses and sets of pre-synaptic and post-synaptic neurons, the synapses connecting pre-synaptic and post-synaptic neurons, an accepting means for accepting an input query pattern, a processing means for applying the Bayesian probability framework for determining a most likely output pattern to the input query pattern based on the input query pattern, stored memory address patterns and associated memory content patterns, and a noise distribution describing how the input query pattern deviates from a memory address pattern, for transforming Bayesian probabilities from the Bayesian probability framework into the neural network, and for optimizing the neural network with respect to the target architecture chosen for implementation, and an output means for returning the most likely output pattern to the input query pattern equal or similar to the memory content pattern associated with the memory address pattern most similar to the input query pattern.

The accepting means for accepting an input query pattern may be a sensor.

The processing means may provide one or more processors, signal processing units and/or other calculation, processing and/or computational hardware and software and may be adopted for parallel processing.

The output means may be a hardware or software interface.

In another aspect of the invention, a method for storing memory address patterns and associated memory content patterns in the neural associative memory structure is provided, comprising the steps of storing the association between memory address patterns and associated memory content patterns within a neural network of the memory structure, wherein the neural network consists of a set of synapses and sets of pre-synaptic and post-synaptic neurons, the synapses connecting pre-synaptic and post-synaptic neurons and wherein data is stored in values associated with the synapses and neurons, by computing a vector of pre-synaptic unit usages by computing a unit usage for each pre-synaptic neuron and storing at least a pre-synaptic unit usage value with each pre-synaptic neuron, computing a vector of post-synaptic unit usages by computing the unit usage for each post-synaptic neuron and storing at least a post-synaptic unit usage value with each post-synaptic, and computing a matrix of synapse usages by computing for each synapse connecting the pre-synaptic neuron to the post-synaptic neuron the synapse usage and storing at least a synapse usage value with each synapse.

In another aspect of the invention, a matrix of synaptic weights can be computed by computing for each synapse the weight using estimates of query noise, unit usages and synapse usages, a vector of neuron thresholds can be computed by computing a threshold for each postsynaptic neuron, and the synaptic weights and neuron thresholds of the neural network may be adjusted based on the computations.

In yet another aspect of the invention, two matrices representing finite and infinite synaptic weights can be computed, where the finite weights neglect infinite components, whereas infinite weights count the number of contributions towards plus and minus infinity, two vectors representing finite and infinite neuron thresholds may be computed, and the finite and infinite synaptic weights and finite and infinite neuron thresholds of the neural network may be adjusted based on the computations.

The computations and/or adjustments can be performed by a processing means, which provides one or more processors, signal processing units and/or other calculation, processing and/or computational hardware and software.

According to a further aspect of the invention, a method for retrieving a memory content pattern from the neural associative memory is provided, comprising the steps of accepting an input query pattern by an accepting means, applying a Bayesian probability framework for determining a most likely output pattern to the input query pattern based on the input query pattern, stored memory address patterns and associated memory content patterns, and a noise distribution describing how the input query pattern deviates from a memory address pattern, transforming Bayesian probabilities from the Bayesian probability framework into a neural network consisting of a set of synapses and sets of pre-synaptic and post-synaptic neurons, the synapses connecting pre-synaptic and post-synaptic neurons, and optimizing the neural network with respect to the target architecture chosen for implementation, by a processing means and returning the most likely output pattern to the input query pattern equal or similar to the memory content pattern associated with the memory address pattern most similar to the input query pattern through a output means.

A first vector of first dendritic potentials of unit usages and synapse usages may be computed by computing a dendritic potential for each post-synaptic neuron, a post-synaptic neuron can be activated, and the output pattern may be returned based on the activation of the post-synaptic neurons.

Also, the post-synaptic neuron may be activated if the dendritic potential for the neuron is equal to or larger than zero.

Moreover, the post-synaptic neuron is activated if the dendritic potential is equal to or larger than a threshold.

Furthermore, an additional second vector of second dendritic potentials may be computed by computing a second dendritic potential for each post-synaptic neuron, each neuron may be assigned a first and a second threshold, and the post-synaptic neuron is activated if either the second dendritic potential is equal to or larger than the second threshold and if its first dendritic potential is equal to the first neuron threshold.

The processing means is also used for the computations and/or adjustments and the processing means may provides one or more processors, signal processing units and/or other calculation, processing and/or computational hardware and software.

In even a further aspect of the invention, n the vectors of dendritic potentials are computed on-the-fly of unit usages and synapse usages.

In another aspect of the invention, the input query pattern is a noise tainted version of one of the memory address pattern.

BRIEF DESCRIPTION OF THE DRAWINGS

FIG. 2 pictures a table with a comparison of different associative memory (AM) models.

DETAILED DESCRIPTION OF THE INVENTION

Figure 1A:
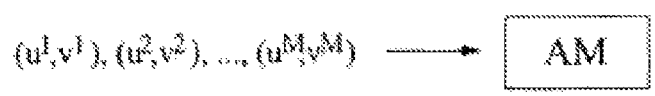
FIG. 1a illustrates a storage phase of memory task.
Figure 1B:
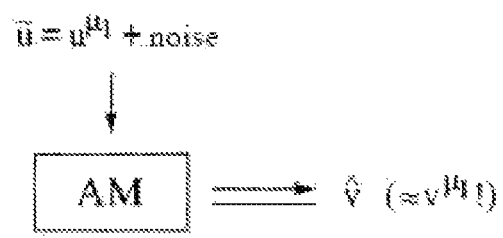
FIG. 1b illustrates a retrieval phase of the memory task.

Neural associative memory networks as considered by this invention are single layer neural networks or perceptrons with fast "one-shot" learning corresponding to the storage of M discrete associations between pairs of binary pattern vectors $\{(u^\mu \to v^\mu): \mu=1, \ldots, M\}$. Here $u^\mu$ is the $\mu$-th memory address pattern being a binary vector of size m. Similarly, $v^\mu$ is the $\mu$-th memory content pattern being a binary vector of size n. Further define the pattern activities $$k^\mu := \sum_{i=1}^m u_i^\mu \text{ and } l^\mu := \sum_{j=1}^n v_j^\mu$$

are defined as the number of one-entries in the $\mu$-th memory address and memory content pattern, respectively. Finally, $k := E_\mu(k^\mu)$ and $l := E_\mu(l^\mu)$ denote the average pattern activities.

The "one-shot" constraint restricts the set of possible learning methods. For example, gradient descent methods (as error backpropagation) are not viable because they require repeated training of the whole pattern set. Instead it is straight-forward to use simple Hebbian-like learning rules:

If, during presentation of a single pattern pair, both the presynaptic and postsynaptic neurons are active, then the synaptic weight must be increased.

The performance of neural associative memory structures is commonly evaluated by the network storage capacity C measuring the stored information bits per synapse, $$C := \frac{\text{stored information}}{\text{\# synaptic contacts}} [\text{bit}/\text{contact}].$$

A related performance measure is the output noise $\epsilon$ defined as the expected Hamming distance $$d_H(v^\mu, \hat{v}) := \sum_{j=1}^n (v_j^\mu - \hat{v}_j^\mu)^2$$

between retrieval result $\hat{v}$ and original memory content pattern $v^\mu$ normalized by the mean content pattern activity l, $$\varepsilon := \frac{d_H(\hat{v}, v^\mu)}{l}.$$

The goal is to maximize C and minimize $\epsilon$. In contrast to previous solutions, the system described by this invention, under some assumptions, maximizes C and minimizes $\epsilon$. Many previous memory systems worked well only under artificial conditions, for example, presuming randomly generated "uncorrelated" memory address patterns $u^\mu$ with independently generated pattern components, or assuming narrowly distributed pattern activities $k^\mu$ (for example constant $k^\mu = k$). Here numerical simulations have revealed that the current invention is much more robust against "correlated" patterns and broadly distributed pattern activities. Further experiments have also shown that the current invention works much better than the previous approaches for "pattern part retrieval", i.e., when the set of active units in the input query patterns $\tilde{u}$ are a subset of the active units in the original memory address patterns $u^\mu$, briefly $\tilde{u} \subset u^\mu$. Pattern part retrieval is particularly important for spiking implementations where the most reliable units fire before the less reliable units. Here, at least in an early phase of retrieval, the pattern part assumption $\tilde{u} \subset u^\mu$ is fulfilled with high probability, and the current invention promises significantly improved performance.

Figure 3:
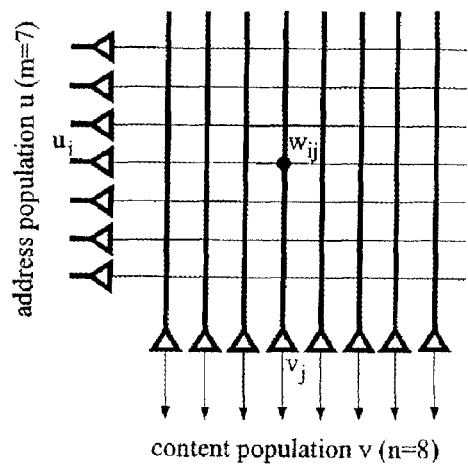
FIG. 3 illustrates an exemplarily neural associative memory (NAM).

FIG. 3, for example, shows the NAM considered by the present invention, which is a two-layer neural network consisting of an address population u (size m) and a content population v (size n). An address neuron $u_i$ can make synaptic contacts with weight onto content neuron $v_j$. When addressing with a input query pattern $\tilde{u}$ a content neuron $v_j$ gets active if the dendritic potential $$x_j := \sum_{i=1}^{m} w_{ij}\tilde{u}_i$$

exceeds the neuron's firing threshold $\theta_j$. Memory associations are stored in the synaptic weights and firing thresholds of the network. FIG. 3 also shows an example of a hetero-associative memory. For identical u and v the network becomes an auto-associative memory with recurrent synaptic connections.

Neuron and Synapse Model

Figure 4:
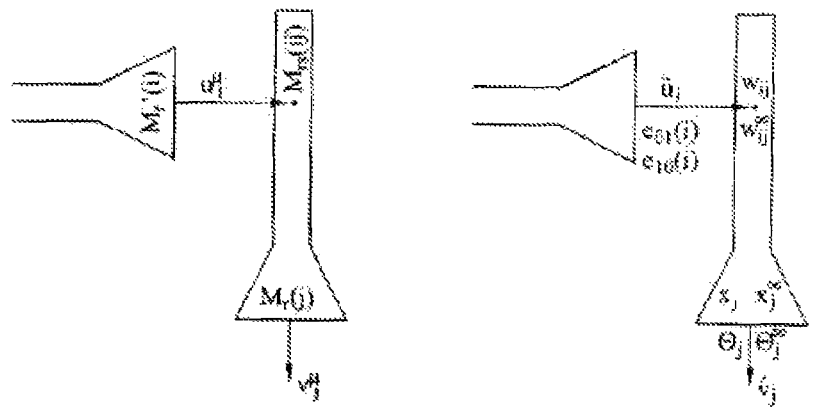
FIG. 4 illustrates a neuron and synapse model according to the current invention.

FIG. 4 illustrates the neuron and synapse model according to the current invention. Each neuron j has a number of state variables: By $M_1(j)$ the "unit usage" counting the number of active memory components during the memory storage phase (see below) is denoted. Similarly, $M_0(j)$ counts the occurrences of inactive memory components. Then, more similar to previous models, each neuron has a continuously valued dendritic potential $x(j)$ and a continuously valued spike threshold $\theta(j)$ which are determined dynamically during retrieval depending on the previously stored memories and the current input query pattern $\tilde{u}$. In some implementations the neuron has also two additional integer variables $x^\infty(j)$ and $\theta^\infty(j)$ counting "infinite components" of dendritic potentials and spike thresholds, respectively. Furthermore, each neuron j has two variables $e_{01}(j)$ and $e_{10}(j)$ estimating the "error probabilities". Here $e_{01}(j)$ estimates the probability that neuron j is active when it should be inactive. Similarly, $e_{10}(j)$ estimates the probability that neuron j is inactive when it should be active.

Each synapse ij connecting neuron i to neuron j has the following state variables: By $M_{11}(ij)$ the "synapse usage" counting the number of co-activations of presynaptic neuron i and postsynaptic neuron j during the memory storage phase (see below) is denoted. Similarly, $M_{10}$ counts the storage events where the presynaptic neuron is active and the postsynaptic neuron is inactive. Similarly, $M_{00}$ counts the storage events where the presynaptic neuron is inactive and the postsynaptic neuron is active. Similarly, $M_{00}$ counts the storage events where both presynaptic and postsynaptic neurons are inactive. Then, more similar to the previous models, each synapse has a continuously valued synaptic weight $w(ij)$. In some implementations each synapse additionally has a binary valued weight $w_{ij}^\infty$ counting "infinite components" of the synaptic weight.

The left panel of FIG. 4 shows that information about memory associations $u^\mu \to v^\mu$ is stored in neurons and synaptic connections. Each presynaptic neuron i stores its unit usages $M'_1(i)$ and $M'_0(i)$. Each postsynaptic neuron j stores its unit usages $M_1(j)$ and $M_0(j)$. Each synapse connecting neuron i to neuron j stores its synapse usages $M_{11}(ij)$, $M_{10}(ij)$, $M_{01}(ij)$, and $M_{00}(ij)$.

The right panel of FIG. 4 shows that for retrieval of information the unit and synapse usages can be transformed to synaptic weights $w_{ij}$ and firing thresholds $\theta_j$ assuming some query error estimates $e_{01}(i)$ and $e_{10}(i)$. Synaptic inputs following the activation of an input query pattern $\tilde{u}$ are summed in the dendritic potential $x_j$ and the corresponding output neuron becomes active $\hat{v}_j=1$, if the dendritic potential exceeds the firing threshold. An adequate handling of infinite weights and thresholds requires additional variables $w_{ij}^\infty$, $x_j^\infty$ and $\theta_j^\infty$ discussed below.

Memory Storage

The task is to store M associations between memory address patterns $u^\mu$ and memory content patterns $v^\mu$ where $\mu=1 \ldots M$. It is assumed that all patterns are binary vectors. Memory address patterns $u^\mu$ have dimension m and memory content patterns $v^\mu$ dimension n. During storage, each address neuron and each content neuron j can memorize its unit usage $$M_1(j) := \#\{\mu : v_j^\mu = 1\}$$

$$M_0(j) := \#\{\mu : v_j^\mu = 0\} = M - M_1(j)$$

$$M'_1(i) := \#\{\mu : u_i^\mu = 1\}$$

$$M'_0(i) := \#\{\mu : u_i^\mu = 0\} = M - M'_1(i)$$

Similarly, each synapse ij can memorize its synapse usage $$M_{11}(ij) := \#\{\mu : u_i^\mu = 1, v_j^\mu = 1\}$$

$$M_{01}(ij) := \#\{\mu : u_i^\mu = 0, v_j^\mu = 1\} = M_1(j) - M_{11}(i,j)$$

$$M_{00}(ij) := \#\{\mu : u_i^\mu = 0, v_j^\mu = 0\} = M'_0(j) - M_{01}(i,j)$$

$$M_{10}(ij) := \#\{\mu : u_i^\mu = 1, v_j^\mu = 0\} = M_0(j) - M_{00}(i,j)$$

where $i=1, \ldots, m$ and $j=1, n$. Note that it is actually sufficient to memorize M, $M_1$, $M'_1$, and $M_{11}$. This means, the variables $M_0$, $M'_0$, $M_{10}$, $M_{01}$, and $M_{00}$ must not necessarily be implemented. Instead, each neuron requires access to M. Therefore, an implementation on a digital computer requires only about $(mn+m+n+1)\mathrm{ld}\, M$ memory bits.

Retrieval

Given an input query pattern $\tilde{u}$ the memory task is to find the "most similar" memory address pattern $u^\mu$ and return a reconstruction $\hat{v}$ of the associated memory content pattern $v^\mu$. For this let us assume that the input query pattern u is a noisy version of $u_\mu$ with estimated independent component error probabilities $$e_{01}(i) := pr[\tilde{u}_i = 1 | u_i^\mu = 0]$$

$$e_{10}(i) := pr[\tilde{u}_i = 0 | u_i^\mu = 1]$$

Now the content neurons j have to decide independently of each other whether to be activated or to remain silent. Given the input query pattern $\tilde{u}$, the optimal maximum-likelihood decision $$\hat{v}_j = \begin{cases} 1, & \frac{pr[v_j^\mu = 1 | \tilde{u}]}{pr[v_j^\mu = 0 | \tilde{u}]} \geq 1 \\ 0, & \text{otherwise} \end{cases}$$

minimizes the expected Hamming distance $$d_H(v^\mu, \hat{v}) := \sum_{j=1}^{n} |v_j^\mu - \hat{v}_j|$$

between original and reconstructed content and, thus, output noise $\epsilon$. If the input query pattern components are conditional independent given the activity of content neuron j, e.g., assuming independently generated memory address pattern components, for a $\in \{0, 1\}$ there is $$pr[\tilde{u} \mid v_j^\mu = a] = \prod_{i=1}^m pr[\tilde{u}_i \mid v_j^\mu = a]$$

$$= \prod_{i=1}^m \frac{M_{\tilde{u}_i,a}(ij)(1 - e_{\tilde{u}_i(1-\tilde{u}_i)}(i)) + M_{(1-\tilde{u}_i)a}(ij)e_{(1-\tilde{u}_i)\tilde{u}_i}(i)}{M_a(j)}.$$

With the Bayes formula $pr[v_j^\mu=a|\tilde{u}]=pr[\tilde{u}|v_j^\mu=a]/pr[v_j^\mu=a]/pr[\tilde{u}]$ $$\frac{pr[v_j^\mu = 1 \mid \tilde{u}]}{pr[v_j^\mu = 0 \mid \tilde{u}]} = \left(\frac{M_0(j)}{M_1(j)}\right)^{m-1} \prod_{i=1}^m \frac{M_{\tilde{u}_i,1}(ij)(1 - e_{\tilde{u}_i(1-\tilde{u}_i)}(i)) + M_{(1-\tilde{u}_i)1}(ij)e_{(1-\tilde{u}_i)\tilde{u}_i}(i)}{M_{\tilde{u}_i,0}(ij)(1 - e_{\tilde{u}_i(1-\tilde{u}_i)}(i)) + M_{(1-\tilde{u}_i)0}(ij)e_{(1-\tilde{u}_i)\tilde{u}_i}(i)} \quad (1)$$

is obtained. For a more efficient and more plausible neural formulation logarithms of the probabilities can be taken and obtain synaptic weights $w_{ij}$, dendritic potentials $x_j$, and firing thresholds $\theta_j$, $$w_{ij} = \log \frac{(M_{11}(1 - e_{01}) + M_{01}e_{01})(M_{00}(1 - e_{01}) + M_{10}e_{10})}{(M_{10}(1 - e_{01}) + M_{01}e_{01})(M_{01}(1 - e_{01}) + M_{11}e_{10})} \quad (2)$$

$$x_j = \sum_{i=0}^m w_{ij}\tilde{u}_i \quad (3)$$

$$\Theta_j = -(m-1)\log\frac{M_0}{M_1} - \sum_{i=1}^m \log\frac{M_{01}(1-e_{01}) + M_{11}e_{10}}{M_{00}(1-e_{01}) + M_{10}e_{10}} \quad (4)$$

where a content neuron fires, $\hat{v}=1$, if the dendritic potential $x_j$ exceeds the firing threshold, $x_j \geq \theta_j$. Note that indices of $M_0$ (j) $M_1$ (j) $e_{01}$(i), $e_{10}$(i), $M_{00}$(ij), $M_{01}$(ij), $M_{10}$(ij), $M_{11}$(ij) are skipped for the sake of readability.

Practical Aspects for an Implementation

The previous sections describe an efficient implementation of the optimal neural associative network model based on Bayesian probabilistic principles constituting a Bayesian probability framework. There are a number of important aspects for a practical implementation (see, e.g., A. Knoblauch. Neural associative networks with optimal Bayesian learning. HRI-ED Report 09-02, Honda Research Institute Europe GmbH, D-63073 Offenbach/Main, Germany, May 2009 for more details):

Note that the neural network formulation equation 3 is much cheaper (in terms of required computation steps) than equation 1, in particular for sparse queries having only a small number of active components with $\tilde{u}_i=1$. However, the synaptic weights equation 2 may not yet satisfy Dale's law that a neuron is either excitatory or inhibitory. To have only positive synaptic weights (which may be more easily to implement and which is more consistent with biology) a sufficiently large constant $c:=-\min_{ij} w_{ij}$ may be added to each weight. Then all synapses have non-negative weights $w'_{ij}:=w_{ij}+c$ and the dendritic potentials remain unchanged if the last sum in equation 3 is replaced by $$\sum_{i=0}^m w_{ij}\tilde{u}_i = \sum_{i=0}^m w'_{ij}\tilde{u}_i - c\sum_{i=0}^m \tilde{u}_i.$$

Here the negative sum could be realized, for example, by feed forward inhibition with a strength proportional to the input query pattern activity previously suggested (cf., e.g., A. Knoblauch. Synchronization and pattern separation in spiking associative memory and visual cortical areas. PhD thesis, Department of Neural Information Processing, University of Ulm, Germany, 2003).

For "pattern part retrieval" assuming input query patterns $\tilde{u}$ with vanishing add-noise, $e_{01} \to 0$, the weights become essentially independent of the error estimates $e_{01}$, $e_{10}$, $$w_{ij} = \log\frac{M_{11}(M_{00} + M_{10}e_{10})}{M_{10}(M_{01} + M_{11}e_{10})} \approx \log\frac{M_{11}M_{00}}{M_{10}M_{01}} \quad (5)$$

Thus, for $e_{01} \to 0$ it is not necessary to recompute the synaptic weights whenever the expected error probabilities change.

The synaptic weights $w_{ij}$ can become plus or minus infinity dependent on the synapse usages: For example, in equation 5 the synaptic weight will become plus infinity if $M_{10}=0$ or $M_{01}=0$. Similarly, the synaptic weight will become minus infinity for $M_{11}=0$ or $M_{00}=0$.

Similar is true for the firing thresholds $\theta_j$ (see equation 4). However, a closer analysis (going back to equation 1) reveals that naive implementations of infinite synaptic weights and infinite firing thresholds are not adequate and lead to suboptimal performance. Instead it is necessary to let the positive and negative infinite components cancel each other. To account for this a neuron model has been developed where each synaptic weight and each neuron threshold is represented by two numbers representing finite and infinite contributions (see FIG. 4). With this model the synaptic weights and firing thresholds of the optimal associative memory compute as follows:

Compute two matrices representing finite and infinite synaptic weights $w_{ij}$ and $w_{ij}^\infty$: For $$d_1:=M_{11}(1-e_{10})+M_{01}e_{01}, d_2:=M_{00}(1-e_{01})+M_{10}e_{10}, d_3:=M_{10}(1-e_{10})+M_{00}e_{01}, d_4:=M_{01}(1-e_{01})+M_{11}e_{10}$$

it is $$w_{ij} = \log\frac{F(d_1)F(d_2)}{F(d_3)F(d_4)}$$

$$w_{ij}^\infty = G(d_3) + G(d_4) - G(d_1) - G(d_2) \in \{-2, -1, 0, 1, 2\}$$

with the gating functions $F(x)=x$ for $x>0$ and $F(x)=1$ for $x \leq 0$, and $G(x)=0$ for $x>0$ and $G(x)=1$ for $x \leq 0$. Thus, $w_{ij}$ represents the finite weight neglecting infinite components, whereas $w_{ij}^\infty$ counts the number of contributions towards plus and minus infinity.

Compute two vectors representing finite and infinite neuron thresholds $\theta(j)$ and $\theta^\infty(j)$:
For $$d_5:=M_{01}(1-e_{01})+M_{11}e_{10} \text{ and } d_6:=M_{00}(1-e_{01})+M_{110}e_{10}$$

it is $$\Theta_j = -(m-1)\log\frac{F(M_0)}{F(M_1)} - \sum_{i=1}^{m}\log\frac{F(d_5)}{F(d_6)}$$

$$\Theta_j^\infty = -(m-1)(G(M_1) - G(M_0)) - \sum_{i=1}^{m}(G(d_6) - G(d_5))$$

where F and G are as before.

Then the corresponding operations to compute a retrieval are as follows:

Compute two vectors of dendritic potentials $$x_j = \sum_{i=1}^{m}\tilde{u}_i w_{ij} \text{ and } x_j^\infty = \sum_{i=1}^{m}\tilde{u}_i.$$

Activate a postsynaptic neuron j if either $x_j^\infty > \theta_j^\infty$ or $x_j^\infty = \theta_j^\infty$ and $x^j \geq \theta_j$.

Note that thus there are three ways to implement the optimal associative memory leading to different storage and computation requirements.

The first way is to store only the unit and synapse usages as described above. This requires to store only m+n+mn integers each of size $\log_2 M$ bits. However, this method requires more computation time because it is necessary, for each input query pattern, to recompute the synaptic weights and firing thresholds or, alternatively, to evaluate equation 1. This method may be advantageous if the error estimates $e_{01}$ and $e_{10}$ are quickly changing such that synaptic weights would have to be recomputed anyway.

The second way is to store the synaptic weights and firing thresholds as described above. A naive implementation will require to store n+mn floating point values. Correspondingly, a retrieval takes only zn+n steps where z:=101 is the number of one-entries in the query vector.

The third way is to account for infinite weights and thresholds as described above. Then storage requires n+mn floating point values and additional mn integers of size $\log_2 5 \leq 3$ bits and n integers of size $\log_2 2m$ bits.

Also note that instead of applying fixed optimal thresholds alternatively an 1-winner-takes-all activation can be used if the number of active units l in a memory pattern (e.g., if $l^\mu$ is constant) is known.

So far the invention describes a hetero-associative memory which corresponds to a feedforward network between two distinct neuron populations u and v (see FIG. 2). If u and v are identical the networks becomes a recurrently connected auto-associative memory performing pattern completion. The invention applies also to the auto-associative case. Note that here the optimal Bayesian synaptic weights are generally asymmetric, $w_{ij} \neq w_{ji}$. This is in contrast to both Hopfield and Willshaw-type networks. This is also in contrast to theoretical stability conditions based on statistical mechanics. Symmetric weights are obtained only in the asymptotic limit when Bayesian learning becomes equivalent to the linear covariance rule (see above) or if one assumes zero add-noise, $e_{01}=0$.

Core of the Invention

The core idea of this invention is to improve learning in neural associative memory structures by applying Bayesian learning principles including estimates of input query component error probabilities. This leads to a novel non-linear learning method given by equations 2 and 5. In practice, an implementation of the corresponding optimal memory system requires the storage of unit usages (e.g., $M_1(j)$) and synapse usages (e.g., $M_{11}(ij)$) as well as two-dimensional representations of synaptic weights (w(ij) and $w^\infty(ij)$), firing thresholds Ku and ($\theta(j)$ and $\theta^\infty(j)$), and dendritic potentials (x(j)) and x'(j)). The two-dimensional variables are required to adequately represent finite and infinite contributions as described above.

Application Areas

Figure 5:
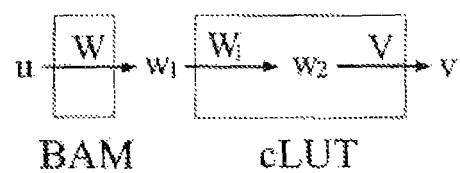
FIG. 5 illustrates a four-layer system for information retrieval according to one embodiment of the invention.

Bayesian neural associative memory as described in the previous sections in a four-layer neural network for information retrieval can generally be applied for efficient implementing nearest neighbor search (FIG. 5). For example, this system for accelerating object recognition systems is used (cf., e.g., S. Hasler, H. Wersing, and E. Korner. A comparison of features in parts-based object recognition hierarchies. In J. Marques de Sa, L. A. Alexandre, W. Duch, and D. P. Mandic, editors, Proceedings of the 17th International Conference on Artificial Neural Networks (ICANN), Part II, LNCS 4668, pages 210-219, Berlin, Heidelberg, 2007. Springer Verlag; S. Kirstein, H. Wersing, and E. Komer. A biologically motivated visual memory architecture for online learning of objects. Nwral Networks, 21(1):65-77, 2008; H. Wersing and E. Körner. Learning optimized features for hierarchical models of invariant object recognition. Neural Computation, 15:1559-1588, 2003) or any other application based on nearest neighbor search on high-dimensional sparse data (see FIG. 6; for more details see A. Knoblauch. On the computational benefits of inhibitory neural associative networks. HRI-EU Report 07-05, Honda Research Institute Europe GmbH, D-63073 Offenbach/Main, Germany, May 2007; 10. A. Knoblauch. Best-match hashing with inhibitory associative networks for real-world object recognition. HRI-EU Report 08-05, Honda Research Institute Europe GmbH, D-63073 Offenbach/Main, Germany, October 2008 and the previous patent application. Here the inhibitory associative network (network IAM of the previous patent application) was replaced by the Bayesian associative network (see BAM in FIGS. 5, 6). This can considerably improve retrieval accuracy at the cost of increased memory and/or computation requirements.

FIG. 5 illustrates a four-layer system for information retrieval according to one embodiment of the invention. The system is basically identical to a system based on inhibitory associative memory (IAM) proposed in the previous patent application except that the IAM of the previous invention was replaced by the Bayesian associative memory (BAM) of the current invention. Here memory address patterns $u^\mu$ are mapped to (carefully chosen) index representations $w^\mu{}_1$ via an BAM which maps via an error-correcting compressed look-up-table (cLUT) to the memory content patterns $v^\mu$.

Figure 6:
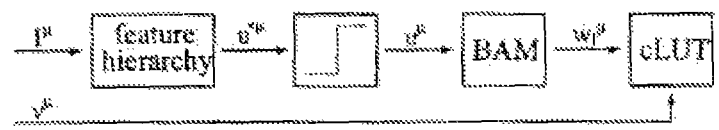
FIG. 6 shows a block diagram of a system for visual object recognition.
Figure 6:
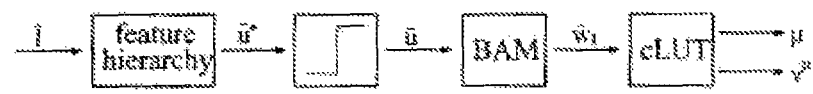

FIG. 6 shows a block diagram of a system for visual object recognition using a Bayesian associative memory (BAM) according to one embodiment of the invention. During learning, images $I^\mu$ are preprocessed in a visual feature hierarchy. The resulting continuous valued feature vector u is binarized resulting in a binary address vector $u^\mu$, which is associated with the content or class label $v^\mu$ employing the four-layer-system described in FIG. 5. During recognition, a test image $\tilde{I}^\mu$ is processed in a similar way. The system (with BAM replaced by an IAM) is described in detail in the previous patent application.

Further possible applications include efficient implementations of LVQ (Learning Vector Quantization), in particular, if the pattern vectors are high-dimensional and moderately sparse and if a very large number of pattern vectors must be stored.

Similarly, potential applications include efficient implementations of clustering algorithms or self-organizing maps if the number of cluster prototypes is large and the prototype vectors are high-dimensional and moderately sparse.

Another potential application is document retrieval: Here the database may consist of a large set of text documents, for example taken from the internet. Each text document consists of (possibly many) words and can be indexed by selecting a relatively small set of key words. The result is a sparse binary feature vector for each text document. Given an input query pattern consisting of a set of key words the task is to find the most relevant documents. This retrieval can be accelerated by the methods proposed here.

A complementary idea is to represent the words in a text document by applying an N-gram code. For example the 1-grams (or monograms) of "memory" are simply the letters "m", "e", "m", "o", "r", "y". Similarly, the 2-grams (or digrams) are "me", "em", "mo", "or", "ry", and the 3-grams are "mem", "emo", "mor", "ory". By that a sparse and fault tolerant code already is obtained very naturally at the word level. For example, for an alphabet of 26 letters, the 2-gram code represents the word "memory" by a binary vector of dimension $26^2=676$ where only 5 components are active. This method can be used, for example, to implement a fault-tolerant code for the keywords described in the previous item. Additionally, the N-gram method can be used to code keyword order and key word sequences in a manner suitable for the associative memory models discussed in this application.

In summary, the inhibitory neural networks and algorithms proposed in this application can be used for any application involving the best match or nearest-neighbor problem if the underlying pattern vectors are high-dimensional and (moderately) sparse.

It should be understood that the foregoing relates only to embodiments of the present invention and that numerous changes and modifications made therein may be made without departing from the scope of the invention as set forth in the following claims.

LIST OF REFERENCES

1. A. W. Burks, H. H. Goldstine, and J. von Neumann. Preliminary discussion of the logical design of an electronic computing instrument. Report 1946, U.S. Army Ordonance Department, 1946.
2. P. Dayan and D. J. Wilishaw. Optimising synaptic learning rules in linear associative memory. Biological Cybernetics, 65:253-265, 1991.
3. S. Hasler, H. Wersing, and E. Korner. A comparison of features in parts-based object recognition hierarchies. In J. Marques de Sa, L. A. Alexandre, W. Duch, and D. P. Mandic, editors, Proceedings of the 17th. International Conference on Artificial Neural Networks (ICANN), Part II, LNCS 4668, pages 210-219, Berlin, Heidelberg, 2007. Springer Verlag.
4. J. Hertz, A. Krogh, and R. G. Palmer. Introduction to the theory of neural computation. Addison-Wesley, Redwood City, 1991.
5. J. J. Hopfield. Neural networks and physical systems with emergent collective computational abilities. Proceedings of the National Academy of Science, USA, 79:2554-2558, 1982.
6. P. Kanerva. Sparse Distributed Memory. MIT Press, Cambridge, Mass., 1988.
7. S. Kirstein, H. Wersing, and E. Komer. A biologically motivated visual memory architecture for online learning of objects. Nwral Networks, 21(1):65-77, 2008.
8. A. Knoblauch. Synchronization and pattern separation in spiking associative memory and visual cortical areas. PhD thesis, Department of Neural Information Processing, University of Ulm, Germany, 2003.
9. A. Knoblauch. On the computational benefits of inhibitory neural associative networks. HRI-EU Report 07-05, Honda Research Institute Europe GmbH, D-63073 Offenbach/Main, Germany, May 2007.
10. A. Knoblauch. Best-match hashing with inhibitory associative networks for real-world object recognition. HRI-EU Report 08-05, Honda Research Institute Europe GmbH, D-63073 Offenbach/Main, Germany, October 2008.
11. A. Knoblauch. Method and device for realizing an associative memory based on inhibitory neural networks, 2008. International Patent Application PCT/EP2008/005001, European Patent Application EP 07 110 870.8.
12. A. Knoblauch. Neural associative networks with incremental learning rules. HRI-ED Report 08-03, Honda Research Institute Europe GmbH, D-63073 Offenbach/Main, Germany, May 2008.
13. A. Knoblauch. Method and device for realizing a neural associative memory based on nonlinear learning of discrete synapses, 2009. European Patent Application, in preparation.
14. A. Knoblauch. Method and device for realizing a neural associative memory based on optimal Bayesian learning, 2009. European Patent Application, in preparation.
15. A. Knoblauch. Neural associative networks with optimal Bayesian learning. HRI-ED Report 09-02, Honda Research Institute Europe GmbH, D-63073 Offenbach/Main, Germany, May 2009.
16. A. Knoblauch, G. Palm, and F. T. Sommer. Memory capacities for synaptic and structural plasticity. Neural Computation, 2009. accepted.
17. T. Kohonen. Associative memory: a system theoretic approach. Springer, Berlin, 1977.
18. G. Palm. Neural Assemblies. An Alternative Approach to Artificial. Intelligence. Springer, Berlin, 1982.
19. G. Palm and F. Sommer. Associative data storage and retrieval in neural nets. In E. Domany, J. L. van Hemmen, and K. Schulten, editors, Models of Neural Networks III, pages 79-118. Springer-Verlag, New York, 1996.
20. K. Steinbuch. Die Lernmatrix. Kybernetik, 1:36-45, 1961.
21. H. Wersing and E. Korner. Learning optimized features for hierarchical models of invariant object recognition. Neural Computation, 15:1559-1588, 2003.
22. D. J. Willshaw, O. P. Buneman, and H. C. Longuet-Higgins. Non-holographic associative memory. Nature, 222:960-962, 1969.
23. F. T. Sommer, P. Dayan, Bayesian Retrieval in Associative Memories with Storage Errors, IEEE Trans Neural Netw. 1998; 9(4):705-13.
24. European patent application EP 2 012 260 A.
25. J. Buckingham, D. Willshaw, On setting unit thresholds in an incompletely connected associative net, Network; Computation in Neural Systems, Volume 4, Issue 4 Nov. 1993, pages 441-459.
26. A. Knoblauch, Neural associative memory for brain modeling and information retrieval, Information Processing Letters, Volume 95, Issue 6 (September 2005), Special issue on applications of spiking neural networks, Pages: 537-544.

I claim:

1. A neural associative memory designed for maintaining associations between memory address patterns and memory content patterns, the memory comprising:
   a plurality of stored memory address patterns and associated memory content patterns,
   a Bayesian probability framework,
   a neural network comprising a set of synapses and sets of pre-synaptic and post-synaptic neurons, the synapses connecting pre-synaptic and post-synaptic neurons,
   means for accepting an input query pattern,
   means for accepting a noise distribution describing how the input query pattern deviates from a memory address pattern,
   means for applying the Bayesian probability framework for determining a most likely output pattern to the input query pattern based on the input query pattern, the stored memory address patterns and associated memory content patterns, and the noise distribution, wherein the Bayesian decision is based on the counter variables $M_1$ (post-synaptic unit usage), $M'_1$ (pre-synaptic unit usage), and $M_{11}$ (synapse usage),
   means for transforming Bayesian probabilities from the Bayesian probability framework into the neural network,
   a means for optimizing the neural network with respect to the target architecture chosen for implementation, and
   output means for returning the most likely output pattern to the input query pattern equal or similar to the memory content pattern associated with the memory address pattern most similar to the input query pattern.

2. The memory of claim 1, wherein the target architecture chosen for implementation is at least one standard computer and/or parallel hardware component.

3. A robot equipped comprising a computing unit and the memory of claim 1.

4. A land, air or sea vehicle comprising the memory of claim 1.

5. A method for storing memory address patterns and associated memory content patterns in a neural associative memory, said method comprising:
   providing a neural associative memory, said memory comprising a plurality of stored memory address patterns and associated memory content patterns, a Bayesian probability framework, a neural network comprising a set of synapses and sets of pre-synaptic and post-synaptic neurons, the synapses connecting pre-synaptic and post-synaptic neurons, means for accepting an input query pattern, means for accepting a noise distribution describing how the input query pattern deviates from a memory address pattern, means for applying the Bayesian probability framework for determining a most likely output pattern to the input query pattern based on the input query pattern, the stored memory address patterns and associated memory content patterns, and the noise distribution, means for transforming Bayesian probabilities from the Bayesian probability framework into the neural network, a means for optimizing the neural network with respect to the target architecture chosen for implementation, and output means for returning the most likely output pattern to the input query pattern equal or similar to the memory content pattern associated with the memory address pattern most similar to the input query pattern, said method further comprising
   accepting pattern pairs of memory address patterns and associated memory content patterns,
   storing the association between memory address patterns and associated memory content patterns within a neural network of the memory structure, wherein the neural network consists of a set of synapses and sets of pre-synaptic and post-synaptic neurons, the synapses connecting pre-synaptic and post-synaptic neurons and wherein data is stored in values associated with the synapses and neurons, by
      computing a vector of pre-synaptic unit usages by computing a unit usage for each pre-synaptic neuron and storing at least a pre-synaptic unit usage value with each pre-synaptic neuron,
      computing a vector of post-synaptic unit usages by computing the unit usage for each post-synaptic neuron and storing at least a post-synaptic unit usage value with each post-synaptic, and
      computing a matrix of synapse usages by computing for each synapse connecting the pre-synaptic neuron to the post-synaptic neuron the synapse usage and storing at least a synapse usage value with each synapse.

6. The method of claim 5, wherein
   a matrix of synaptic weights is computed by computing for each synapse the weight using estimates of query noise, unit usages and synapse usages,
   a vector of neuron thresholds is computed by computing a threshold for each postsynaptic neuron, and
   the synaptic weights are adjusted and neuron thresholds of the neural network based on the computations.

7. The method of claim 5, wherein
   two matrices representing finite and infinite synaptic weights are computed, where the finite weights neglect infinite components, whereas infinite weights count the number of contributions towards plus and minus infinity,
   two vectors representing finite and infinite neuron thresholds are computed, and
   the finite and infinite synaptic weights and finite and infinite neuron thresholds of the neural network are adjusted based on the computations.

8. A method for retrieving a memory content pattern from a neural associative memory, said method comprising:
   providing a neural associative memory, said memory comprising a plurality of stored memory address patterns and associated memory content patterns, a Bayesian probability framework, a neural network comprising a set of synapses and sets of pre-synaptic and post-synaptic neurons, the synapses connecting pre-synaptic and post-synaptic neurons, means for accepting an input query pattern, means for accepting a noise distribution describing how the input query pattern deviates from a memory address pattern, means for applying the Bayesian probability framework for determining a most likely output pattern to the input query pattern based on the input query pattern, the stored memory address patterns and associated memory content patterns, and the noise distribution, means for transforming Bayesian probabilities from the Bayesian probability framework into the neural network, a means for optimizing the neural network with respect to the target architecture chosen for implementation, and output means for returning the most likely output pattern to the input query pattern equal or similar to the memory content pattern associated with the memory address pattern most similar to the input query pattern;

storing memory address patterns and associated memory content patterns in the neural associative memory, said storing comprising accepting pattern pairs of memory address patterns and associated memory content patterns, storing the association between memory address patterns and associated memory content patterns within a neural network of the memory structure, wherein the neural network consists of a set of synapses and sets of pre-synaptic and post-synaptic neurons, the synapses connecting pre-synaptic and post-synaptic neurons and wherein data is stored in values associated with the synapses and neurons, by computing a vector of pre-synaptic unit usages by computing a unit usage for each pre-synaptic neuron and storing at least a pre-synaptic unit usage value with each pre-synaptic neuron, computing a vector of post-synaptic unit usages by computing the unit usage for each post-synaptic neuron and storing at least a post-synaptic unit usage value with each post-synaptic, and computing a matrix of synapse usages by computing for each synapse connecting the pre-synaptic neuron to the post-synaptic neuron the synapse usage and storing at least a synapse usage value with each synapse; said method further comprising accepting an input query pattern, accepting a noise distribution describing how the input query pattern deviates from a memory address pattern, applying a Bayesian probability framework for determining a most likely output pattern to the input query pattern based on the input query pattern, the stored memory address patterns and associated memory content patterns, and the noise distribution, wherein the Bayesian decision is based on the counter variables $M_1$, $M'_1$ and $M_{11}$, transforming Bayesian probabilities from the Bayesian probability framework into a neural network consisting of a set of synapses and sets of pre-synaptic and post-synaptic neurons, the synapses connecting pre-synaptic and post-synaptic neurons, optimizing the neural network with respect to the target architecture chosen for implementation, and returning the most likely output pattern to the input query pattern equal or similar to the memory content pattern associated with the memory address pattern most similar to the input query pattern.

9. The method of claim 8, wherein a first vector of first dendritic potentials of unit usages and synapse usages is computed by computing a dendritic potential for each post-synaptic neuron, a post-synaptic neuron is activated, and the output pattern is returned based on the activation of the post-synaptic neurons.

10. The method of claim 9, wherein the post-synaptic neuron is activated if the dendritic potential for the neuron is equal to or larger than zero.

11. The method of claim 9, wherein the post-synaptic neuron is activated if the dendritic potential is equal to or larger than a threshold.

12. The method of claim 8, wherein an additional second vector of second dendritic potentials is computed by computing a second dendritic potential for each post-synaptic neuron, each neuron is assigned a first and a second threshold, and the post-synaptic neuron is activated if either the second dendritic potential is equal to or larger than the second threshold and if its first dendritic potential is equal to the first neuron threshold.

13. The method of claim 8, wherein the vectors of dendritic potentials are computed on-the-fly of unit usages and synapse usages.

14. The method of claim 8, wherein the input query pattern is a noise tainted version of one of the memory address pattern.

15. A robot provided with computing means for executing the method of claim 8.

16. A land, air or sea vehicle provided with computing means for executing the method of claim 8.

* * * * *